(12) United States Patent
Li et al.

(10) Patent No.: US 9,580,601 B2
(45) Date of Patent: Feb. 28, 2017

(54) POLYURETHANE BASED ASPHALT COMPOSITION

(71) Applicant: Dow Global Technologies LLC, Midland, MI (US)

(72) Inventors: Wei Li, Shanghai (CN); Yi Zhang, Witchita, KS (US); Huan Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/029,719

(22) PCT Filed: Jun. 26, 2014

(86) PCT No.: PCT/CN2014/080818
§ 371 (c)(1),
(2) Date: Apr. 15, 2016

(87) PCT Pub. No.: WO2015/078178
PCT Pub. Date: Jun. 4, 2015

(65) Prior Publication Data
US 2016/0257813 A1    Sep. 8, 2016

(30) Foreign Application Priority Data

Nov. 27, 2013  (WO) ............... PCT/CN2013/087974
Apr. 10, 2014  (WO) ............... PCT/CN2014/075064

(51) Int. Cl.
*C08L 95/00*    (2006.01)
*C08G 18/48*    (2006.01)
*C08G 18/58*    (2006.01)

(52) U.S. Cl.
CPC .......... *C08L 95/00* (2013.01); *C08G 18/4825* (2013.01); *C08G 18/58* (2013.01); *C08L 2555/80* (2013.01)

(58) Field of Classification Search
None
See application file for complete search history.

(56) References Cited

U.S. PATENT DOCUMENTS

| 5,278,257 A * | 1/1994 | Mulhaupt | C08L 9/00 525/107 |
| 2002/0128355 A1* | 9/2002 | Wollum | C08L 95/00 524/59 |
| 2010/0256322 A1* | 10/2010 | Kramer | C08G 18/10 528/51 |
| 2012/0017804 A1* | 1/2012 | Venema | C08L 95/00 106/281.1 |
| 2012/0041117 A1* | 2/2012 | Aerts | C08L 93/04 524/274 |

\* cited by examiner

*Primary Examiner* — Randy Gulakowski
*Assistant Examiner* — Christopher M Rodd

(57) ABSTRACT

A polyurethane based asphalt composition includes an asphalt component and a polyurethane resin system that is the reaction product of an isocyanate component that includes at least one polyisocyanate and an isocyanate-reactive component that includes a cardanol-modified epoxy polyol. The cardanol-modified epoxy polyol is a reaction product of an epoxy component and an epoxy-reactive component at a ratio of epoxy groups to epoxy reactive groups from 1:0.95 to 1:5. The epoxy-reactive component includes a cardanol component.

9 Claims, 1 Drawing Sheet

POLYURETHANE BASED ASPHALT COMPOSITION

FIELD

Embodiments relate to a polyurethane based asphalt composition that includes asphalt and a polyurethane resin system having a cardanol modified polyol (which contains at least two hydroxyl groups and at least one moiety derived from cardanol) such as a cardanol modified epoxy polyol, and methods of manufacturing thereof.

INTRODUCTION

Asphalt based products can be applied in a variety of forms, e.g. emulsions or blends, and processed by a variety of techniques. Asphalt is relatively inexpensive and provides good properties with respect to weather resistant and water impermeable. Consequently, asphalt could be found in many industry products on the market, such as roofing, joint sealing, specialty paints, paving (e.g., of roadways and driveways), hot melt adhesives, water retention barriers, etc. For example, the asphalt based products may be used as waterproofing and/or anti-corrosion coatings for the protection of metal and concrete substrates. Asphalt may also be reclaimed so as to be recycled.

Asphalt compositions typically include a curable material that adds a rubbery elastomeric consistency to the resultant asphalt based product. The requirement for the efficient intermixing of the curable material and the asphalt is good compatibility between the two materials. However, as asphalt, also known as bitumen, may be sticky, black, and highly viscous liquid or a semi-solid petroleum at ambient or room temperature, compatible mixing especially with polyurethane based materials has been found to be difficult. Accordingly, there is a strong need in the industry to find solutions for enhancing the compatibility between asphalt and polyurethane materials so as to form a polyurethane based asphalt composition that meets desirable performance standards. In particular, with efficient intermixing of a polyurethane based material and the asphalt, the desired mechanical properties such as tensile strength and elongation can be achieved.

SUMMARY

Embodiments may be realized by providing a polyurethane based asphalt composition that includes an asphalt component and a polyurethane resin system that is the reaction product of an isocyanate component that includes at least one polyisocyanate and an isocyanate-reactive component that includes a cardanol-modified epoxy polyol. The cardanol-modified epoxy polyol is a reaction product of an epoxy component and an epoxy-reactive component at a ratio of epoxy groups to epoxy reactive groups from 1:0.95 to 1:5. The epoxy-reactive component includes a cardanol component.

DETAILED DESCRIPTION

Figure 1A:
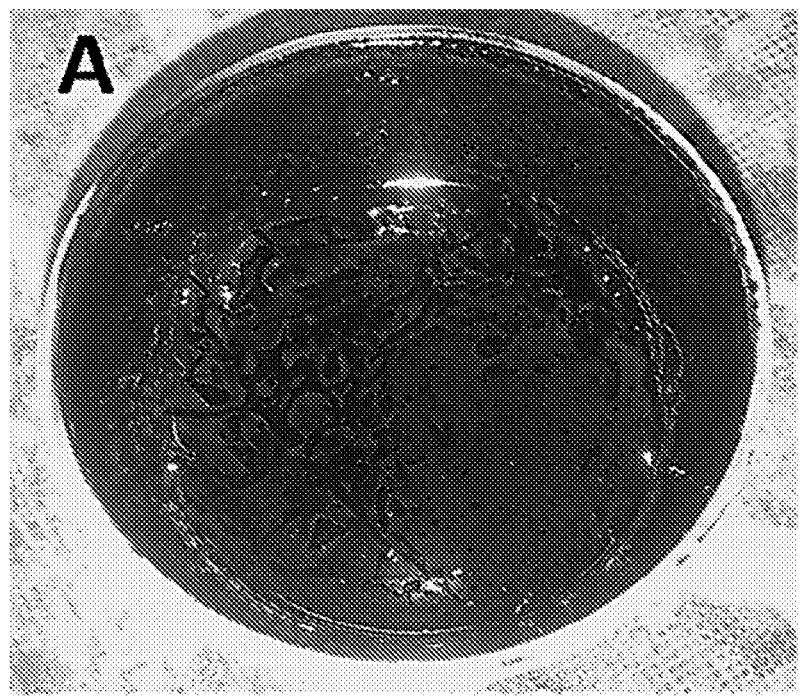
FIGS. 1A and 1B illustrate exemplary coatings.

There is a need in the industry for a composition that combines an epoxy and asphalt together to form a miscible composition, e.g., which exhibits a synergy of a combination of properties such as a high mechanical strength, a high temperature performance, and/or a high anticorrosion performance. Further, it would be highly desirable to be able to produce a novel curable epoxy resin composition wherein the composition exhibits the required properties for various applications such as protective coatings/layers, road pavements, and civil engineering applications.

It is believed that in embodiments, an epoxy compound and asphalt can be readily combined with each other in the presence of a polyol derived from cardanol. The cardanol may be a component in cashew nutshell liquid (CNSL), e.g., such that in the presence of a polyol derived from cardanol in the CNSL a cardanol modified polyol is formed. For example, the polyol derived from cardanol may improve the compatibility between the asphalt and the epoxy resin. By compatible it is meant the property or capability of substances to mix in all proportions sufficient to form an essentially homogeneous mixture. The asphalt based composition may include (i) an epoxy resin compound containing a CNSL moiety such as a cardanol based moiety, (ii) a hardener compound containing the reaction product of an isocyanate and a CNSL derived polyol such as a cardanol modified polyol that could be a cardanol modified epoxy polyol, and (iii) mixtures thereof. A cardanol modified polyol may be a non-epoxy derived polyol such as cardanol derived Novolac polyol, e.g., as discussed in Publication No. WO 2011/003446 (which may be further alkoxylated to form a hydroxyl polyol). Another example of a cardanol modified polyol is based on a Mannich reaction with formaldehyde and an ethanol amine to form a Mannich base that is also a polyol (which may be further alkoxylated to form a hydroxyl polyol).

Exemplary embodiments also relate to a cardanol modified polyol that is a cardanol modified epoxy polyol. For example, according to embodiments, a polyurethane resin system that incorporates the chemistries of polyurethane and epoxy provides both compatibility with asphalt (e.g., coatings including both the polyurethane resin system and the asphalt are observed as uniform) and the desired mechanical properties (e.g., a tensile strength greater than 1.0 MPa and an elongation % greater than 350). The polyurethane resin systems may be used in asphalt based compositions and composites and/or coatings including the asphalt based compositions. The resultant composites and/or coatings may be used in harsh environmental conditions. The polyurethane resin system may replace petrochemical based resins with a biomass based resin that is a reaction product of an epoxy resin and a biomass derived compound such as cardanol. For example, U.S. Pat. No. 7,812,101 discusses a ratio of epoxy groups to epoxy reactive groups from 1:0.2 to 1:0.8, but such a partially modified biomass based resin may not be suitable for use in polyurethane based asphalt compositions. Embodiments have a ratio of epoxy groups to epoxy reactive groups that is from 1:0.95 to 1:5.

Polyurethane resin systems (e.g., thermoset and/or thermoplastic) include a mixture having an isocyanate component and an isocyanate-reactive component. The polyurethane resin system are based on polyurethane groups formed by the reaction of an isocyanate moiety with an isocyanate reactive group such as a hydroxyl moiety. The isocyanate component includes at least one polyisocyanate and the isocyanate-reactive component includes a polyol component. The polyol component may include at least one cardanol modified polyol, e.g., one hydroxyl group of polyol may be pre-reacted to form an ester bond embedded within the structure of the polyol. According to exemplary embodiments, moisture tolerance is achieved by using a natural oil derived cashew nutshell liquid, while still realizing mechanical performance and relatively long gel times. Dependent on the application, sufficient gel times may be achieved for use in asphalt applications (such as coatings) in an effort to allow for improved application.

The polyurethane resin system may be a pre-made reaction product incorporated into an asphalt based composition (e.g., in the form of a prepolymer), the individual components that form the polyurethane resin system may be incorporated into the asphalt based composition, or a combination thereof. For example, the isocyanate component may be at least partially (or entirely) pre-reacted with the isocyanate-reactive component to be in the form of an isocyanate-terminated prepolymer, which prepolymer is then combined with at least asphalt to form the asphalt based composition. When the prepolymer is used, an additional amount of separate polyol may be directly added to the asphalt based composition. When the prepolymer is not used, the isocyanate component and the isocyanate-reactive component of the polyurethane resin system may be directly mixed with asphalt to form the asphalt based composition.

In the polyurethane resin system, the isocyanate component includes at least one polyisocyanate. Exemplary polyisocyanates include diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE. According to an exemplary embodiment, the at least one isocyanate has an average functionality of from 2.8 to 3.2 (e.g., 2.2 to 2.9, etc.) and a free isocyanate group content (i.e., NCO content) of from 25 wt % to 35 wt % (e.g., 30 wt % to 32 wt %).

In the polyurethane resin system, the polyol component includes at least one cardanol modified polyol (which contains at least two hydroxyl groups and at least one moiety derived from cardanol and/or CNSL), such as at least one cardanol-modified epoxy (CME) polyol. The CME polyol may be formed by reacting a cardanol containing component (such as CNSL) with an epoxy component. The polyurethane resin system may account for 5 wt % to 65 wt % (e.g., 20 wt % to 60 wt %, 30 wt % to 55 wt %, 35 wt % to 65 wt %, 35 wt % to 50 wt %, etc.) based on the total weight of the polyurethane based asphalt composition. For example, the polyurethane resin system may account for less than the 50 wt % of the total weight of the polyurethane based asphalt composition such that the primary component in the composition is asphalt.

The polyol component may optionally include additional polyols (or optionally an amines), such as a polyether or polyester polyol. If included, at least one of the additional polyol and/or amine may be added at a same time as the CME polyol or a different time. For example, when a prepolymer is used, the at least one additional polyol may be included in the polyol component for forming the prepolymer (in addition to the CME polyol) or separately added to the asphalt composition. When the prepolymer is not used, the at least one additional polyol may be mixed with the components of the asphalt based composition at the same time as the CME polyol or the use of additional polyols may be avoid. In particular, phase separation with asphalt before curing may be minimized by not adding additional polyols when the prepolymer is not used. In particular, use of the CME polyol based prepolymer without or without the use of an additional polyol may avoid the typically observed difficulty in using polyurethane together with asphalt based on compatibility issues. The use of the CME polyol with or without an additional polyol (in exemplary embodiments without the additional polyol) may avoid the typically observed difficulty in using polyurethane together with asphalt based on compatibility issues.

The at least one other polyol may have a petroleum based building block (e.g., propylene oxide, ethylene oxide, and/or butylene oxide) or a natural oil derived building block. According to exemplary embodiments, a propylene oxide-glycerine based polyol, a poly(tetramethylene ether) glycol based polyol, a polypropylene glycol based polyol, and/or a polybutadiene based polyol may be used in the isocyanate-reactive component. For example, a propylene oxide based polyether (such as one available under the tradename VORANOL™ from The Dow Chemical Company) and/or a natural oil derived polyol (such as castor oil) may be used in the isocyanate-reactive component. The at least one other polyol may be a diol or triol having a molecular weight form 500 g/mole to 2000 g/mole. According to exemplary embodiments, the isocyanate-reactive component may include from 5 wt % to 100 wt % of the CME polyol and from 0 wt % to 95 wt % of the at least one other polyol, based on a total weight of the polyols in the isocyanate-reactive component.

The isocyanate component and/or the isocyanate-reactive component may include an additive component, which includes an additive such a curative agent, a catalyst, a surfactant, a plasticizer, a filler, a solvent, a chain extender, and/or a crosslinker. Optionally, the isocyanate-reactive component may include an amine such as a diamine or triamine.

The CME polyol in the polyol component of the polyurethane resin system is a reaction product of a mixture that includes an epoxy component and an epoxy-reactive component. The epoxy-reactive component includes a cardanol component (and may include an optional phenol or phenol derivative component). The epoxy-reactive component includes phenols with hydrogen atoms that are reactive with epoxy groups in the epoxy component. The epoxy-reactive component may include at least 50 wt % (e.g., at least 60 wt %, at least 70 wt %, at least 80 wt %, at least 90 wt %, and/or 100 wt %) of the cardanol component, based on a total weight of the epoxy-reactive component. A remainder of the epoxy-reactive component may be the phenol or phenol derivative component and/or the additive component. The epoxy component and/or the epoxy-reactive component may include the additive component (e.g., that may include an additive such as a curative agent, a catalyst, a surfactant, a plasticizer, a filler, a solvent, a chain extender, and/or a crosslinker). A ratio of epoxy groups in the epoxy component to the epoxy reactive groups in the epoxy-reactive component may be from 1:0.95 to 1:5 (e.g., 1:0.95 to 1:4, 1:0.95 to 1:3, 1:0.95 to 1:2, 1:0.95 to 1:1.5, etc.). According to exemplary embodiments, an excess of the epoxy-reactive component may be used, e.g., the ratio may be from 1:1.01 to 1:5, 1:1.05 to 1:3, 1:1.5 to 1:2.5, 1:2 to 1:3, etc.).

The epoxy component for forming the CME polyol includes at least one epoxy resin. The at least one epoxy resin may account for 90 wt % to 100 wt % of the epoxy component, with any remainder optionally being a portion or an entirety of the additive component. The amount of epoxy resin may be in the range of from 0 wt % to about 95 wt % based on the total weight of the asphalt based composition (e.g., from 10 wt % to 75 wt %, from 20 wt % to 50 wt %, etc.). According to embodiments, the asphalt based composition includes epoxy resin compounds that are reacted with a CNSL moiety. For example, such epoxy resin compounds may include an epoxidized CNSL, an epoxy resin modified CNSL, a reaction product of epoxy resin and CNSL, and mixtures thereof. For example, the epoxy resin compound may be a CNSL-modified epoxy resin. A CNSL-modified epoxy resin includes the reaction product of (i) an epoxy resin and (ii) CNSL such as the cardanol component in CNSL. The epoxy resin, component (i) used to prepare the CNSL-modified epoxy resin can be, e.g., one or more of the same aforementioned epoxy resins without a cashew nutshell liquid moiety.

The epoxy component may include a wide variety of epoxy compounds. Any epoxy compound that improves the mechanical and thermal performance of the composition may be used. For example, the epoxy compounds or polyepoxides may be aliphatic, cycloaliphatic, aromatic, heterocyclic and mixtures thereof. Epoxy resins useful in the embodiments described herein may include for example mono-functional epoxy resins, multi- or poly-functional epoxy resins, and combinations thereof. Exemplary epoxy resins for the epoxy component include polyepoxides that have at least two epoxide moieties per molecule (e.g., the epoxy resin may have a 2 to 10 epoxide functionality, a 2 to 6 epoxide functionality, a 2 to 4 epoxide functionality, etc.). The epoxy resin backbone may be saturated or unsaturated, aliphatic, cycloaliphatic, aromatic, or heterocyclic and may be substituted (e.g., contain at least one substituent such as halogen, hydroxyl, and/or ether groups). The epoxy resin may be monomeric or polymeric. The epoxy resin may have an equivalent epoxy weight (EEW) from 20 g/eq to 1000 g/eq (e.g., 30 g/eq to 800 g/eq, 50 g/eq to 600 g/eq, 100 g/eq to 500 g/eq, etc.), which EEW is the measure of the number of grams of resin for one chemical equivalent of an epoxy group.

According to exemplary embodiments, a raw material liquid epoxy resin that is from 60 wt % to 95 wt % (e.g., 70 wt % to 90 wt %, etc.) based on the total weight of the epoxy resin, of a diglycidylether of bisphenol, such as Bisphenol A and Bisphenol F, may be used. The epoxy equivalent weight (EEW) of the raw material liquid epoxy resin may be from 150-250 (e.g., 160-220, 170-200, etc.). As used herein, the term "liquid epoxy resin" refers to the resin in a liquid state without adding any solvent. Exemplary epoxy resins include bisphenol A diglycidyl ether, bisphenol F diglycidyl ether, resorcinol diglycidyl ether, and triglycidyl ethers of para-aminophenols. The epoxy resin compound containing a CNSL moiety can be, e.g., a CNSL glycidyl ether. The CNSL glycidyl ether compound can be one or more of the compounds prepared and described in Kanehashi, S., et al., Preparation and Characterization of Cardanol-based Epoxy Resin for Coating at Room Temperature Curing, Journal of Applied Polymer Science, 2013. 130(4): p. 2468-2478. Some of the CNSL glycidyl ether compounds described in the reference above include, e.g., monoglycidyl ether of cardanol, diglycidyl ether of cardol, or mixtures thereof.

An exemplary raw material liquid epoxy resin has the Formula (I) below,

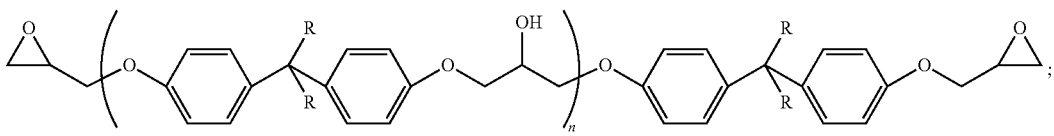

wherein n is 0 or 1 (in an exemplary embodiment n is 0). The average n value of the liquid epoxy resin (I) is from 0 to 1 (e.g., 0 to 0.5, 0 to 0.3, etc.). R is independently H or —$CH_3$.

The epoxy resin component may include an epoxy resin that is commercially available, e.g., from The Dow Chemical Company under the tradenames D.E.R. and D.E.N. Examples of epoxy resin includes, but are not limited to, D.E.R.™ 331, which is a commercial product of The Dow Chemical Company, D.E.R.™ 354 of The Dow Chemical Company, D.E.R.™ 332 of The Dow Chemical Company, D.E.R.™ 330 of The Dow Chemical Company, and D.E.R.™ 383 of The Dow Chemical Company. Exemplary commercially available epoxy resins that may be used include DER™ 331, DER™ 383, DER™ 671, DER™ 736, DER™ 852, and DENIM 438, which are available from The Dow Chemical Company. The viscosity and cost of the resultant CME polyol may be controlled by the choice of the epoxy resin used in the epoxy component.

The cardanol component in the epoxy-reactive component for forming the CME polyol includes a cardanol component (e.g., CNSL) that may be a by-product of cashew nut processing (e.g., may be extracted from a layer between a nut and a shell of a cashew nut). Cardanol is a monohydroxyl phenol having a long hydrocarbon chain in the meta position. The cardanol useful in embodiments is one component of CNSL, an oil isolated from the shell of the cashew nut.

The concentration of cardanol in the CNSL may be, based on the total weight of the CNSL, about 10 wt %, about 50 wt %, or about 90 wt %; and at the same time, about 99 wt % or less, about 97 wt % or less, or about 95 wt % or less. For example, the cardanol component has a cardanol content of at least 50 wt % (e.g., from 60 wt % to 100 wt %, from 85 wt % to 100 wt %, etc.), based on a total weight of the second cardanol component. An exemplary structure of cardanol is a phenol containing one hydroxyl group, and an aliphatic side chain $R_1$ in the meta-position, as shown in the Formula (II) below,

wherein, $R_1$ is —$C_{15}H_{25}$, —$C_{15}H_{27}$, or —$C_{15}H_{29}$.

The cardanol component includes cardanol as a primary component and may additionally include cardol, methylcardol, and/or anacardic acid as secondary components. The cardanol component may be subjected to a heating process (e.g., at the time of extraction from the cashew nut), a decarboxylation process, and/or a distillation process. Cardol can be illustrated, for example, by the following general chemical formula:

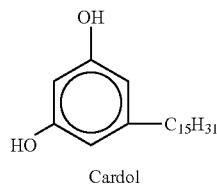

Cardol

The concentration of cardol in the CNSL may be, based on the total weight of the CNSL, about 0.1 wt % or more i, about 1 wt % or more, or about 5 wt % or more; and at the same time, about 90 wt % or less, about 50 wt % or less, or about 10 wt % or less. Further, the CNSL may include minor concentrations of other materials such as anacardic acid, oligomers of cardanol, oligomers of cardol, and mixtures thereof. The total concentration of the other materials present in the CNSL is may be less than about 10 wt %.

According to exemplary embodiments, the cardanol component may include from 20 wt % to 50 wt % (e.g., from 20 wt % to 45 wt %, from 20 wt % to 40 wt %, 30 wt % to 40 wt %, etc.) of cardol, with a remainder based on a total of 100 wt % of the cardanol component being methylcardol and/or anacardic acid. The cashew nutshell liquid of the cardanol component is available, e.g., from HDSG Beijing Technology under the tradename F-120 series or F-180 series. Without intending to be bound by this theory, the first cardanol component may increase hydrophobicity, reduce viscosity, increase gel time of the polyurethane resin, and/or provide tensile strength.

The epoxy-reactive component may include at least 50 wt % (e.g., at least 60 wt %, at least 70 wt %, at least 80 wt %, at least 90 wt %, and/or 100 wt %) of the cashew nutshell liquid, based on a total weight of the epoxy-reactive component.

A remainder of the epoxy-reactive component may be the optional phenol or phenol derivative component and/or the additive component (e.g., that includes at least one catalyst and/or at least one solvent).

The optional phenol or phenol derivative component includes at least one phenol and/or at least one phenol derivative. The reaction mixture may include the optional phenol or phenol derivative component at a molar ratio from 0.5:1.5 to 1.5:0.5 (e.g., 0.8:1.2 to 1.2:0.8, 0.9:1.1 to 1.1:0.9, etc.) for the moles of the phenol or phenol derivative to the moles of the cardanol component in the reaction mixture. For example, the molar amount of the cardanol component used may be reduced based on the molar amount of the phenol or phenol derivative used. Exemplary phenol derivatives include a naphthol based compound, a phenylphenol based compound, and a hexachlorophene based compound.

For example, the epoxy-reactive component may include from 0.1 wt % to 20 wt % (0.1 wt % to 15 wt %), based on the total weight of the epoxy-reactive component, of another phenol based compound such as a dihydric phenol. The term dihydric phenol refers to a phenolic compound containing 2 hydroxyl groups. According to exemplary embodiments, dihydric phenol refers to either of (A) a phenol with two hydroxyl groups on one benzene ring in the Formula (III), wherein $R_2$ is H or a $C_1$-$C_{15}$ aliphatic chain; or (B) a composition containing two benzene ring each with one hydroxyl group on it in the Formula (IV), wherein R is H or —$CH_3$; and $R_3$ to $R_{10}$ is H or a $C_1$-$C_6$ aliphatic chain.

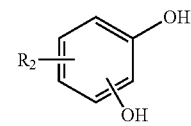

(III)

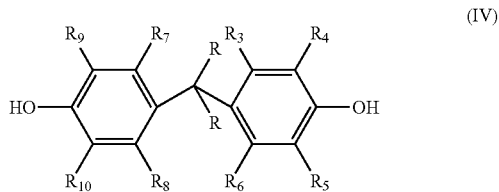

(IV)

Another example of a phenol containing two hydroxyl groups is resorcinol.

Exemplary catalysts for the additive component for forming the CME polyol include tertiary amines, Mannich bases formed from secondary amines, nitrogen-containing bases, alkali metal hydroxides, metal alkoxides, alkali phenolates, alkali metal alcoholates, hexahydrothiazines, organometallic compounds, quaternary ammonium compounds, phosphonium compounds, and sulfonium compounds. For exemplary, the catalyst component may include NaOH, KOH, ethyl triphenyl phosphonium acetate, imidazole, and/or triethylamine. The catalyst component may be present in an amount from 0.01 wt % to 3 wt % (e.g., 0.03 wt % to 1.5 wt %, 0.05 wt % to 1.5 wt %, etc.) based upon the total weight of the reaction mixture for forming the CME polyol. The reaction between the epoxy component and the epoxy-reactive component may be carried out neat or in the presence of an inert organic solvent. Exemplary solvents include ketone (such as methyl isobutyl ketone and/or methyl amyl ketone), toluene, xylene, and glycol ethers (such as the dimethyl ether of diethylene glycol). Fillers such as inorganic and/or organic fillers, coloring agents, water-binding agents, surface-active substances, plant protection agents, extenders and/or plasticizers may be included in the additive component. The reaction for forming the CME polyol may be conducted at a temperature of 120° C. to 180° C., e.g., for 1 hour to 48 hours.

The CME polyol includes an epoxy derived backbone and at least two secondary isocyanate reactive groups, i.e., secondary hydroxyl groups, for reaction with isocyanate groups in the isocyanate component. The CME polyol may allow for adjustment of curing time, e.g., based on the slower reactivity of secondary isocyanate reactive groups relate to primary isocyanate reactive groups. The epoxy backbone may act as a building block and determine the functionality number and chemical structure of the resultant CME polyol. Synthesis of the CME polyol includes a reaction between cardanol in the second cardanol component and an opened epoxy resin produced from a ring-opening reaction of the epoxy resin in the epoxy component. For example, the CME polyol includes a cardanol linkage with the ring opened epoxy resin, which results in an ether bond between the opened epoxy resin and the cardanol. The time required to complete the modification reaction depends upon the factors such as the temperature employed, the chemical structure of the compound having more than one reactive hydrogen atom per molecule employed, and the chemical structure of the epoxy resin employed.

According to exemplary embodiments, the CME polyol may include a compound having the following Formula V when synthesis is carried out using an epoxy resin, which has two epoxide moieties and a resin backbone, and the second cardanol component, which has therein at least mono-unsaturated cardanol:

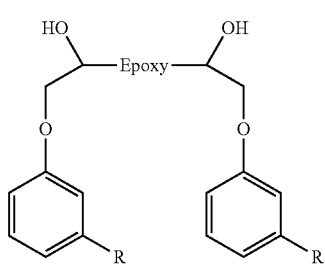

Formula V

In the above Formula 1, the R groups are independently equal to $C_{15}H_{31-n}$ (in which n=0, 2, 4, or 6) or $C_{17}H_{33-n}$ (in which n=0, 2, or 4). In particular, the R group is independently a saturated or unsaturated straight alkyl chain that includes fifteen or seventeen carbon atoms, and the CME polyol may be derived from a cardanol mixture that variously includes cardanols having different R groups. The Epoxy in Formula V is the epoxy resin derived backbone.

According to an exemplary embodiment, the synthesis of a CME polyol using a bisphenol A based diepoxide resin and the second cardanol component that has therein at least mono-unsaturated cardanol, includes the following reaction stage:

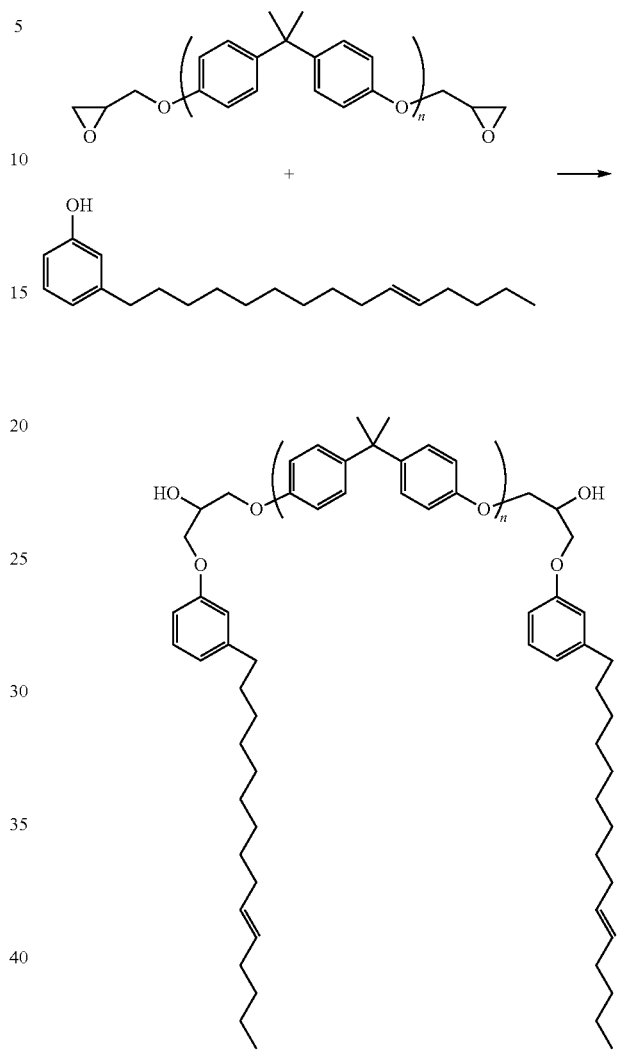

According to another exemplary embodiment, the synthesis of a CME polyol using an aliphatic diepoxide epoxy resin and the second cardanol component that has therein at least mono-unsaturated cardanol, includes the following reaction stage:

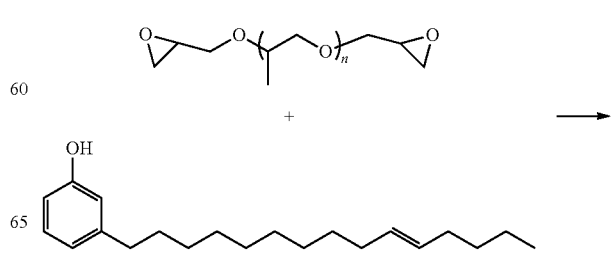

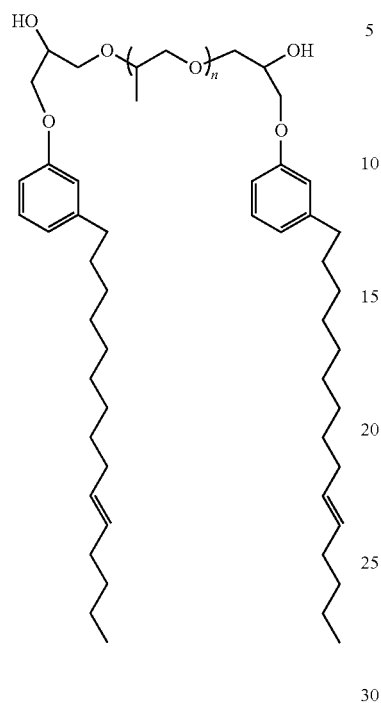
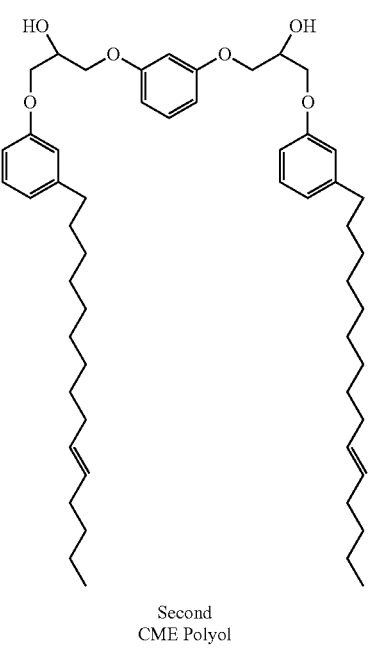
Second
CME Polyol
Other exemplary CME polyol structures that are synthesized using various aromatic epoxy resins and the second cardanol component include the following:
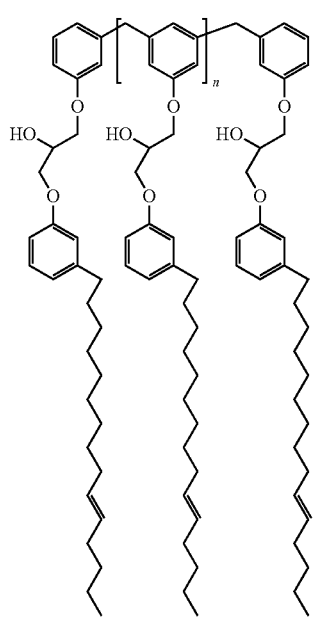
First CME Polyol
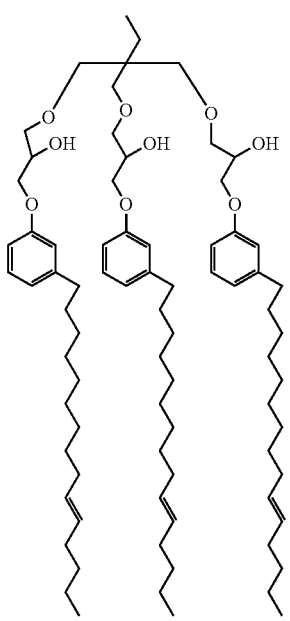
Third CME Polyol

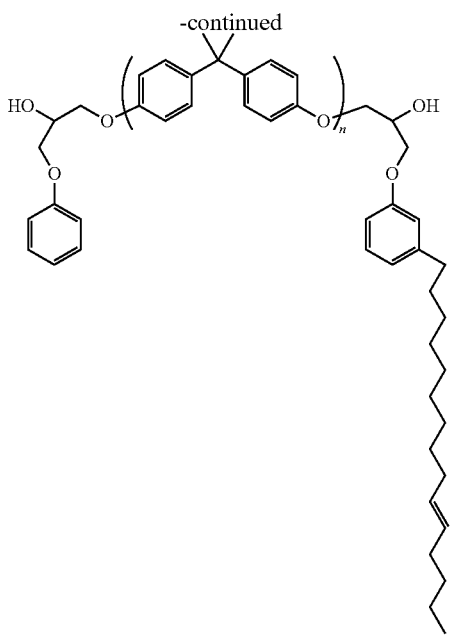

Fourth CME Polyol

The First CME Polyol, above, is synthesized using an aromatic polyepoxide based resin and mono-unsaturated cardanol. The Second CME Polyol, above, is synthesized using a phenyl diepoxide resin and mono-unsaturated cardanol. The Third CME Polyol, above, is synthesized using an aliphatic polyepoxide based resin and mono-unsaturated cardanol. The Fourth CME Polyol, above, is synthesized using a bisphenol A based diepoxide resin, phenol, and mono-unsaturated cardanol.

Without intending to be bound by this theory, the cardanol in the CME polyol may introduce hydrophobicity into the resultant polyurethane resin. The increased hydrophobicity may be expressed as a low water absorbance in humid conditions, e.g., a low water absorbency. Further, hydrolysis and bubbling (e.g., the effect of bubbles being generated by carbon dioxide release from a reaction between water and an isocyanate component in the reaction mixture), may be reduced and/or avoided. The epoxy resin derived backbone of the CME polyol may provide property improvements such as mechanical performance and material compatibility to the polyurethane resin. Mechanical performance and/or other desired properties of the CME polyol may be adjusted in view of the alkyl chain moiety on the cardanol in the cardanol component. Phenol or phenol derivatives added into the reaction mixture for forming the CME polyol may initialize the epoxy group ring-opening reaction, while the cardanol component may offer hydrophobicity characteristics and anti-hydrolysis performance.

In the reaction mixture for forming the CME polyol, the ratio of epoxy groups in the epoxy component to the epoxy reactive groups in the epoxy-reactive component is from 1:0.95 to 1:5 (e.g., 1:0.98 to 1:4, 1:0.99 to 1:3, 1:1 to 1:2.5, 1:1 to 1:1.1, etc.). For example, the excess of epoxy reactive groups provided from the cardanol component may enable sufficient conversion of the epoxy resin to the CME polyol and/or provide low viscosity to the reaction mixture (which low viscosity also enables sufficient conversion). An epoxy residue left in the resultant reaction product of the reaction mixture for forming the CME polyol, may be less than 0.2 wt %, based on a total weight of the resultant reaction product. For example, an epoxide equivalent weight of the resultant reaction product may be at least 8,000 grams/equivalent (e.g., from 9,000 g/eq to 100,000 g/eq, from 20,000 g/eq to 100,000 g/eq, from 30,000 g/eq to 100,000 g/eq, etc.), as measured according to ASTM D1652. A hydroxyl value of the resultant reaction mixture may be at least 40 mg KOH/g (e.g., from 40 mg KOH/g to 300 mg KOH/g, 60 mg KOH/g to 200 mg KOH/g, 80 mg KOH/g to 100 mg KOH/g, etc.), as measured according to ASTM D4274. The hydroxyl value may account for the CME polyol and unreacted hydroxyl groups in the epoxy-reactive component.

According to an exemplary embodiment, full conversion (i.e., a conversion rate of at least 93%) of the epoxy groups in the reaction mixture for forming the CME polyol to hydroxyl groups may be realized. According to exemplary embodiments, the reaction mixture that forms the CME polyol may have a conversion rate of 95% of the epoxy groups to hydroxyl groups and an EEW of at least 9,000 g/eq or a conversion rate of 98.5% of the epoxy groups to hydroxyl groups and an EEW of at least 30,000 g/eq. For example, full conversion may be demonstrated by gel permeation chromatography (GPC) spectra characterization, which may indicate that the lower molecular weight epoxy component has essentially reacted out resulting in full conversion to the higher molecular weight CME polyol. Full conversion may be demonstrated by Fourier transform infrared (FTIR) spectrometry, which may indicate that the infrared pattern corresponding to the epoxy component is essentially not present or is present in a negligible amount in the infrared pattern corresponding to the CME polyol. Full conversion may be demonstrated by nuclear magnetic resonance spectrometry, which may indicate that the magnetic properties pattern corresponding to the epoxy component is essentially not present or is present in a negligible amount in the magnetic properties pattern corresponding to the CME polyol.

For the polyurethane resin system, when not used in prepolymer form, the isocyanate-reactive component and the isocyanate component may be added at an isocyanate index from 60 to 300 (e.g., 60 to 120, 80 to 150, 90 to 120, 100 to 115, etc.). The isocyanate index is measured as the equivalents of isocyanate in the reaction mixture for forming the polyurethane resin, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage. When used in prepolymer form, the resultant reaction product may have an NCO (i.e., isocyanate moiety) content from 2 wt % to 15 wt % (e.g., 3 wt % to 10 wt %, 4 wt % to 8 wt %, 4 wt % to 6.5 wt %, etc.). The isocyanate index may be from 90 to 300 (e.g., 150 to 250, 175 to 200, etc.)

Dyes and/or pigments (such as titanium dioxide and/or carbon black), may be included in the additive component to impart color properties to the polyurethane resin system. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane resin.

The asphalt based composition includes an asphalt component, the polyurethane resin system, and an optional additive component (e.g., that includes a curative agent, a catalyst, a chain extender, a surfactant, a plasticizer, a filler, a solvent, a UV stabilizer, an antioxidants, an air release agent, an adhesion promoter, and/or another additive that is known to one of ordinary skill in the art for use in asphalt based compositions). After the asphalt, the polyurethane resin system, and optionally the additive component are mixed, the resultant mixture may be cured (e.g., by the application of heat and/or radiation). The cured product of the asphalt based composition may be used as a coating, e.g., a water proof coating and/or other coatings where one of ordinary skill in the art would anticipate an asphalt composition may be used.

The asphalt component includes an asphalt formulation, e.g., a commercial available asphalt/bitumen formulation. Asphalt occurs naturally or as a petroleum derivative. The asphalt mainly includes bitumens, which are generally saturate and unsaturated hydrocarbons (e.g., aliphatic and/or aromatic hydrocarbons having up to 150 carbon atoms). In addition, asphalt may include asphaltenes, high molecular weight resins, heterocyclic compounds containing sulphur, nitrogen, and/or oxygen, and/or trace amounts of metals such as iron, nickel, and/or vanadium. The asphalt formulation of the asphalt component may include from 70 wt % to 100 wt % of bitumens, e.g., according to an exemplary embodiment the asphalt formulation may be at least 90% pure asphalt/bitumens. The asphalt formulation may account for 100 wt % of the asphalt component.

The asphalt component may account for 15 wt % to 75 wt % (e.g., 25 wt % to 70 wt %, 30 wt % to 65 wt %, 35 wt % to 60 wt %, etc.) of the polyurethane based asphalt composition. For example, when the polyurethane resin system is included as a prepolymer, the asphalt component may account for 30 wt % to 55 wt % (e.g., 35 wt % to 55 wt %, etc.) of the total weight of the asphalt based composition. The asphalt component may be the primary component in the composition such that the amount of the asphalt is greater than the amount of the polyurethane resin system. When the individual components of the polyurethane resin system are mixed with the asphalt, the asphalt component may account for 45 wt % to 65 wt % (e.g., 50 wt % to 65 wt %, etc.) of the total weight of the asphalt based composition.

Asphalt for the asphalt component may be a dark brown to black cement-like residuum obtained from the distillation of suitable crude oils, as defined in ASTM D8-13. In Europe asphalt is called bitumen. Examples of suitable asphalt useful may include heavy traffic asphalt such as AH-70 or AH-90 asphalt, polymer-modified asphalt such as SBS-modified asphalt or SBR-modified asphalt, or mixtures thereof.

Asphalt material can be in the form of an emulsion. An asphalt emulsion is a suspension of minute globules of bituminous material in water or in an aqueous solution. Use of an asphalt emulsion (or a bituminous emulsion) may be avoided in the embodiments. Coal tar as known in the art is an asphalt-like material that is a dark brown to black cementitious material produced by destructive distillation of bituminous coal. Use of coal tar is may be avoided in the embodiments.

The asphalt useful in the embodiments may have a needle penetration at 25° C. of from 40 decimillimeters (dmm) to 100 dmm, from 50 dmm to 90 dmm, and/or from 60 dmm to 90 dmm, according to the T0604-2011 method described in the JTG E20-2011 standard. In another embodiment, suitable commercially available asphalt useful in the embodiments may include, e.g., Zhonghai 70# asphalt, Zhonghai 90# asphalt, Donghai 70# asphalt, and Donghai 90# asphalt (all which are available from Sinopec); AH-70# asphalt and AH-90# asphalt (both available from Shell); or mixtures thereof.

The amount of asphalt used in the embodiments may be in the range of from 2 wt % to 90 wt %, based on the total weight of the resin forming components of the composition, from 6 wt % to 75 wt %, and/or from 10 wt % to 50 wt %.

For forming the asphalt based composition, a resin index of may be chosen according to the mechanical property requirement. By resin index it is meant the ratio between isocyanate (NCO) moieties and active hydrogens (e.g., as derived from hydroxyl groups) present as compared to the amount stoichimetrically required. For example, a resin index of 1 means equal amounts (1:1 ratio) of isocyanate moieties and active hydrogens are present. A resin index greater than 1 means an excess of isocyanate moieties are present, e.g., a resin index of 1.5 means isocyanate moieties are present in excess of 50% based on the amount stoichimetrically required. According to embodiments, the resin index may be higher than 1, such as 1.05, 1.20, or 1.50.

Based on the viscosity of the polyurethane resin system (e.g., of the polyol component when a prepolymer such as a liquid prepolymer is not used) a solvent (e.g., toluene) is added as part of the optional additive component. The solvent may be a low boiling point solvent that will evaporate in the curing process and/or will essentially not influence the mechanical properties of the final cured composition. For example, for the relatively lower viscosity systems, no solvent is added into the composition. For the medium viscosity systems, the amount of solvent added may be from 5 wt % to 45 wt % of the system or polyol component. For higher viscosity systems, the amount of solvent added is from 45 wt % to 75 wt % of the system or polyol component.

The optional additive component may include a catalyst and/or curing agent. Exemplary catalysts include catalysts include tertiary amines, Mannich bases formed from secondary amines, nitrogen-containing bases, alkali metal hydroxides, alkali phenolates, alkali metal alcoholates, hexahydrothiazines, and organometallic compounds. The catalyst may be added, in amount from 0.001 wt % to 10 wt %, based on the total weight of the asphalt based composition. The catalyst may accelerate the curing time of isocyanate moieties (maybe in the isocyanate component or in prepolymers) and active hydrogens (maybe polyols and/or chain extenders) to offer mechanical properties.

With respect to gel time of the polyurethane resin, a balance may be realized between the need for a quick cure time to form the final asphalt based composite article, the need for adequate flowability of the polyurethane resin during the process of forming the composite article, and the need to prevent excessive wasteful flow of the polyurethane resin. Gel time (i.e., string gel time) is determined as the interval between the time that the reactive components are first mixed to form a reacting liquid mixture until the reacting liquid mixture becomes stringy (i.e., the material has built enough molecular weight to transition from a liquid to a solid). In particular, the determination of stringing may be include repeatedly touching the reaction mixture with a stick and pulling the stick away from the liquid and stringing occurs when the material in the reaction mixture has polymerized to the point that a single or multiple filaments remain on the end of the stick.

The polyurethane based asphalt composition may be a curable epoxy resin composition that includes a hardener component in addition to the polyurethane resin system or as part of the polyurethane resin system. The amount of the hardener component used may vary depending on whether the hardener component is used in addition to or as part of the polyurethane resin system. The hardener component (also referred to as a curing agent or crosslinking agent) may include a hardener component without a CNSL derived moiety, a hardener component containing a CNSL derived moiety, or mixture thereof. The hardener may be blended with the asphalt and/or polyurethane resin system, or may be pre-reacted with a cardanol modified polyol.

The hardener compound without a CNSL derived moiety may include, e.g., any conventional hardener known in the art useful for including in a curable epoxy resin composition. The hardener useful in the curable composition may be selected from, e.g., but are not limited to, anhydrides, carboxylic acids, amine compounds, phenolic compounds, or mixtures thereof. In exemplary embodiments, the hardener may be selected from, e.g., aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. The amount of the hardener compound without a cashew nutshell liquid moiety used may be in the range of from 0 wt % to 50 wt % based on the total weight of the polyurethane based asphalt composition components (e.g., from 1 wt % to 40 wt %, from 5 wt % to 30 wt %, etc.).

The hardener component may be reacted with cardanol such as a CNSL derived moiety. For example, such a hardener compound containing the CNSL derived moiety can include a phenalkamine, a CNSL-modified anhydride, and mixtures thereof. The hardener containing the CNSL derived moiety can be, e.g., one or more phenalkamines. A phenalkamine known in the art as the condensation product of (i) a polyamine, (ii) CNSL, and (iii) formaldehyde, via the Mannich reaction (aminomethylation), may be used. The polyamine, component (i) used to produce a phenalkamine, can be, e.g., an aliphatic ethyleneamine, a cycloaliphatic amine, an aromatic amine, or mixtures thereof. For example, the phenalkamine can be ethylenediamine (EDA), diethylenetriamine (DETA), triethyenetetraamine (TETA), tetraethylenepentaamine (TEPA), N-aminoethylenepiperazine (AEP), isophorone diamine (IPDA), m-xylene diamine (MXDA), or mixtures thereof. The CNSL, component (ii) used to prepare a phenalkamine can be, e.g., any one or more compounds containing a CNSL moiety previously described above. For example, in one embodiment, the CNSL compound may include cardanol. The formaldehyde (CH$_2$O or HCHO), component (iii) used to prepare a phenalkamine, may be available commercially and can also be obtained as a commercial solution.

In another embodiment, the hardener compound containing a CNSL moiety can be, e.g., a CNSL-modified anhydride. A CNSL-modified anhydride resin is the reaction product of (i) an anhydride, and (ii) CNSL. The anhydride, component (i) used to prepare the CNSL-modified anhydride, can include, e.g., phthalic acid anhydride and derivatives of phthalic acid anhydride, nadic acid anhydride and derivatives of nadic acid anhydride, trimellitic acid anhydride and derivatives of trimellitic acid anhydride, pyromellitic acid anhydride and derivatives of pyromellitic acid anhydride, benzophenonetetracarboxylic acid anhydride and derivatives benzophenonetetracarboxylic acid, dodecenylsuccinic acid anhydride and derivatives of dodecenylsuccinic acid anhydride, poly(ethyloctadecanedioic acid) anhydride and derivatives of poly(ethyloctadecanedioic acid) anhydride, and the like, or mixtures thereof. Each of the above CNSL-modified anhydride resins can be used alone or in an admixture thereof. The CNSL, component (ii) used to prepare the CNSL-modified anhydride, can include, e.g., any one or more compounds containing a CNSL moiety previously described above. For example, in one embodiment, the CNSL compound may comprise cardanol. The amount of hardener containing a CNSL derived moiety used may be in the range of 0 wt % to 50 wt % based on the total weight of the polyurethane based asphalt composition (e.g., from 1 wt % to 40 wt %, from 5 wt % to 30 wt %, etc.).

When the composition is said to be "processable", "processable," or "processability" with reference to the composition herein means that the composition is readily and/or easily handled at room temperature without having to heat the composition beyond room temperature. When the composition is cured, the composition may show essentially no signs of phase separation in the resultant cured articles made from such composition, and when the composition is cured to form a product such as a final coating, the cured product formed may show essentially no signs of defects. The polyurethane based asphalt composition of the embodiments may be able to be cured as a homogeneous coating film with (i) no phase separation visually observable by the naked eye, (ii) no phase migration to the surface to the film visually observable by the naked eye, and (iii) no wrinkling on the film surface visually observable by the naked eye.

Besides improving the compatibility between the asphalt and the polyurethane resin system, the asphalt composition of exemplary embodiments may exhibit at least one of the following features:

(1) Embodiments may provide a curable composition containing asphalt such that the viscosity of asphalt is reduced and the handling of asphalt can be performed at mediate or ambient temperatures without VOC concerns.

(2) The epoxy resin component of the curable composition may impart good mechanical performance and thermal resistance to the cured product by forming a crosslinked network. By good mechanical performance it may be meant the result coating/layer has a tensile strength greater than 1.0 MPa and an elongation % greater than 350. By good thermal resistance it is meant the resin system's resistance to the effect of elevated temperatures.

(3) The cardanol and/or CNSL derived present in the composition may aid in providing good anti-corrosion or corrosion resistance properties to the composition.

An exemplary embodiment the polyurethane based asphalt composition is capable of being used at a relatively cold or ambient temperature (e.g., <about 50° C.) in mixed asphalt and asphalt waterproofing applications. The resultant modified asphalt may have excellent strength comparable to conventional asphalt compositions. The polyurethane based asphalt composition may also be capable of being used (or cured) at elevated temperatures such as at temperatures greater than about 50° C. to about 200° C., so as to provide flexibility/adjustability in the handling of the composition at a wider temperature range.

The polyurethane based asphalt component may contain essentially no solvent (except for unintentional contamination quantities introduced with starting raw materials) that can potentially emit into the environment. By this it is meant, "No solvent", "solvent-free", or "free of solvent" such that the concentration of solvent in the formulation is essentially zero (disregarding any trace amounts of solvent). However, optionally, the polyurethane based asphalt composition can also include a solvent as one of the components in the composition; thus, providing flexibility/adjustability in formulating the composition for various end uses.

The polyurethane based asphalt composition may be used in coatings applications to provide benefits such as preparing coatings formulations at a cost comparable or lower than conventional asphalt compositions. The composition may be used to produce coatings having anticorrosion performance comparable and/or improved over to coatings prepared from conventional asphalt compositions.

The polyurethane based asphalt composition may be (i) processable at a temperature of from 20° C. to 30° C.; and (ii) substantially free of phase separation. When the polyurethane based asphalt composition is cured, the resultant cured product may be substantially free of defects.

The process for preparing the polyurethane based asphalt composition may include admixing or blending (e.g., in known mixing equipment) one of the following: (1) the polyurethane resin system, the asphalt component, and optionally any other desirable additives; or (2) the epoxy resin component, the compound containing a cardanol moiety, the hardener component, the asphalt, and optionally any other desirable additives. Any of the above-mentioned optional additives, e.g., a curing catalyst, may be added to the curable composition during the mixing or prior to the mixing to form the curable composition.

All of the compounds of the curable formulation may be mixed and dispersed at a temperature enabling the preparation of an effective curable epoxy resin composition. For example, the temperature during the mixing of all components may be from 100° C. to 10° C. (e.g., from 50° C. to 20° C., etc.). Lower mixing temperatures may help to minimize reaction of the epoxide and hardener in the composition to maximize the pot life of the composition.

The preparation of the curable formulation, and/or any of the steps thereof, may be a batch or a continuous process. The mixing equipment used in the process may be any vessel and ancillary equipment well known to those skilled in the art.

The curable composition may exhibit at least one of the following:

(1) No modification of asphalt by reaction is necessary to improve the compatibility between the asphalt and the epoxy component.

(2) A homogenous film/layer/coating may be formed with no phase separation, phase migration to the surface, and/or any wrinkling of the surface.

(3) No solvent or a low concentration of solvent is needed in the composition. The amount of the solvent used may be in the range of from 0 wt % to 30 wt %, based on the total weight of the curable composition (e.g., from 1 wt % to 20 wt %, from 2 wt % to 15 wt %, etc.).

(4) An asphalt concrete may be paved using the composition in the form of a cold or hot mixed asphalt without using an asphalt emulsion. For example, the asphalt concrete is able to be paved in a temperature range of from 20° C. to 50° C., when used as a cold mixed asphalt, and from 150° C. to 200° C., when used as a hot mixed asphalt.

(5) No extra steps may be required in the method of producing the curable composition such as a step of oxidizing the asphalt before it is used.

The polyurethane based composition may be used as a composition for preparing a composition with enhanced adhesion between the asphalt and aggregates. The adhesion can reach to grade 4 to grade 5 by following the test method of "T0616-1993 asphalt and coarse aggregate adhesion test" in "Highway engineering asphalt and asphalt mixture test procedures" (JTJ052-2000).

According to exemplary embodiments, a process for curing the composition (e.g., a process known in the art) may be used to form a thermoset or cured composition. For example, the composition or formulation may be cured under conventional processing conditions to form a film, a coating, or a solid. Curing the curable composition may be carried out at curing reaction conditions including a predetermined temperature and for a predetermined period of time sufficient to cure the composition. The curing conditions may be dependent on the various components used in the curable composition such as the hardener used in the formulation. The curing reaction conditions include, e.g., carrying out the reaction under a temperature, generally in the range of from −5° C. to 60° C. (e.g., 0° C. to 50° C., 5° C. to 25° C., etc.)

The use of the curable formulation and the curing of the composition may employ conventional equipment and methods well known to those skilled in the art. For example, to prepare asphalt concrete used in pavement applications, the curable epoxy resin composition can be applied to roads using asphalt pavers, screeds, and push rollers and the like. The applied composition can be cured by heating the composition at the aforementioned curing temperatures. In asphalt waterproofing layer applications, the curable epoxy resin composition can be applied, e.g., as a waterproofing layer using squeegees, spray guns, and brushes and the like. The applied composition can be cured by heating the composition at the aforementioned curing temperatures.

For coating applications, the curable epoxy resin composition can be applied to substrates, e.g., using airless sprayers and air-assisted pneumatic sprayers and the like. The applied composition can be cured by heating the composition at the aforementioned curing temperatures.

The cured product (i.e., the cross-linked product made from the curable composition) may exhibit improved properties over conventional epoxy asphalt coating compositions. For example, the asphalt used in the curable composition can be petroleum asphalt or natural asphalt, which are readily available in the industry.

The cured product made from the curable composition can exhibit a combination and balance of advantageous properties including, e.g., Tg, mechanical performance, thermal performance, corrosion resistance, waterproofing performance, and the like.

For example, the cured product or composite may have a high glass transition temperature (Tg). The cured product can exhibit a Tg in the range of between 0° C. and 180° C. (e.g., 5° C. and 140° C., 10° C. and 100° C., etc.). The Tg of the cured product can be measured, e.g., by the method described in ASTM E1356.

The cured product or composite may have a high tensile strength. For example, the cured product can exhibit a tensile strength of up to 40 MPa (e.g., from 1 MPa to 40 MPa, from 2 MPa to 30 MPa, and from 5 MPa to 20 MPa, etc.). The tensile strength of the cured product can be measured, e.g., by the method described in ASTM D638.

The cured product or composite have a high softening point. For example, the cured product can exhibit a softening point temperature in the range of between 10° C. and 120° C. (e.g., 20° C. and 90° C., 30° C. and 70° C., etc.). The softening point of the cured product can be measured, e.g., by the method described in ASTM D3461.

The cured product or composite may have an excellent anticorrosion resistance. For example, the cured product can show essentially no signs of "blister up" for a period of time of no less than approximately 100 hour (hr) exposure to a salt spray environment, no less than approximately 500 hr exposure to a salt spray environment, no less than approximately 1,000 hr exposure to a salt spray environment, and/or no less than approximately 1,500 hr exposure to a salt spray environment. The corrosion resistance of the cured product can be measured, e.g., by the method described in ASTM B 117.

The cured product or composite may have an excellent waterproofing performance. For example, the cured product can show water absorption of no more than approximately 1%, no more than approximately 0.5%, and/or no more than approximately 0.1%. The water absorption of the cured product can be measured, e.g., by the method described in ASTM D570.

The curable polyurethane based asphalt composition includes a combination of components or compounds that deliver unique properties. As aforementioned, exemplary embodiments may be used to prepare asphalt concrete for pavement applications, asphalt waterproofing layers, and coatings.

By way of summation and review, curable prepolymer systems, e.g., a polyurethane system, an epoxy system, or thermoplastic elastomeric polymers including Styrene-Butadiene-Styrene (SBS) resin or Polyvinyl Chloride (PVC) resin, may be intermixed with asphalt and flow or spread over a surface to cure to a rubbery, elastomeric consistency in the applications. Asphalt compatible polyurethane resin systems are preferred due to cost efficiency and manufacturing efficiency. Further, asphalt compatible polyurethane resin systems that include at least one natural oil derived component is also preferred due to environmental advantages. However, sufficient compatibility between asphalt and polyurethanes, which have polar urethane linkage in the polymer, may not be achieved because of high paraffinic content in the asphalt. Accordingly, materials similar to asphalt, e.g., coal tar, coumarone resin, and/or substantially non-volatile petroleum based materials, usually partially or entirely replace asphalt when a polyurethane resin system is used. However, these replacement materials encounter issues of either being carcinogenic or more expensive than asphalt.

It has also been proposed that compatibility between a polyurethane composition and asphalt found by introducing polybutadiene polyol, due to the low polarity coming from lack of an ether linkage. However, the resultant mechanical properties and price of polybutadiene polyol impose limits on the use of polybutadiene polyol in polyurethane based asphalt composition. Accordingly, there are strong needs in industry to find alternative solutions for enhancing the compatibility between asphalt and polyurethane materials.

According to embodiments, a polyurethane resin system that incorporates the chemistries of polyurethane and epoxy provides both compatibility with asphalt and the desired mechanical properties (e.g., with respect to tensile strength, elongation, and/or modulus). Further, the polyurethane resin system may replace petrochemical based resins with a biomass based resin that is a reaction product of an epoxy resin and a biomass derived compound such as cardanol. For example, U.S. Pat. No. 7,812,101 discusses a ratio of epoxy groups to epoxy reactive groups from 1:0.2 to 1:0.8, but such a partially modified biomass based resin may not be suitable for use in polyurethane based asphalt compositions. As such exemplary embodiments have a ratio of epoxy groups to epoxy reactive groups that is from 1:0.95 to 1:5.

Exemplary embodiments are directed toward an asphalt based composition including asphalt and an epoxy modified cashew nut shell liquid derived moiety. In the asphalt composition, all of the components of the composition may be compatible with each other, the temperature of handling the composition may be reduced from a typical use temperature in the range of 150° C.-200° C. to a use temperature of <about 50° C., and/or the mechanical and thermal performance of the composition remains intact or is improved. Exemplary embodiment are also directed toward a process for preparing the asphalt based composition and a cured product produced using the asphalt based composition.

All percentages are by weight, unless indicated otherwise. All values for molecular weight are based on number average molecular weight, unless indicated otherwise.

EXAMPLES

The following materials are used:

D.E.R.™ 383 An aromatic epoxy resin that is a reaction product of epichlorohydrin and bisphenol A, having an epoxide equivalent weight of approximately 183 g/eq (available from The Dow Chemical Company).

D.E.R.™ 736 An epoxy resin that is dipropylene glycol-diglycidyl ether, having an epoxide equivalent weight of approximately 175 to 205 g/eq (available from The Dow Chemical Company).

XY694 An epoxy resin that is a resorcinol diglycidyl ether, having an epoxide equivalent weight of approximately 118 to 134 g/eq (available from Anhui Hengyuan Chemical Company).

XY636 An epoxy resin that is a trimethylol propane triglycidyl ether (TMPEG), having an epoxide equivalent weight of approximately 135 to 147 g/eq (available from Anhui Hengyuan Chemical Company).

D.E.R.™ 331 An aromatic epoxy resin that is a reaction product of epichlorohydrin and bisphenol A, having an epoxide equivalent weight of approximately 182-192 g/eq (available from The Dow Chemical Company).

CNSL A A cashew nutshell liquid that includes 94 wt % of cardonal (available as CNSL S9405 from Hua Da Sai Gao [i.e., HDSG of Beijing] Technology).

VORANOL™ 2110-TB A polyether polyol, having a nominal hydroxyl functionality of approximately 2, having a hydroxyl number of approximately 110 mg KOH/g, and a number average molecular weight of approximately 1000 g/mol (available from The Dow Chemical Company).

PolyBd A polybutadiene based polyol, having an average hydroxyl number of approximately 54 mg KOH/g (available as R-45HTLO Polyol from Sartomer Co.).

MOCA A chain extender including 4,4'-Methylene bis(2-chloroaniline) (available from Suzhou Mingda Chemistry Industry Co., Ltd).

Solvent A toluene based solvent (available from Sinopharm Chemical Reagent Co., Ltd).

Benzoyl Chloride A neutralizing agent (available from Sinopharm Chemical Reagent Co., Ltd).

Catalyst A A catalyst that includes 70 wt % ethyltriphenylphosphonium acetate in methanol (available from Alfa Aesar).

Catalyst B A DMDEE based catalyst (available as Jeffcat® DMDEE from Huntsman)

PAPI™ 27 A polymeric diphenylmethane diisocyanate (MDI), having an NCO content of approximately 31.4 wt % and a functionality of approximately 2.7 (available from The Dow Chemical Company).

VORANATE™ T 80 A toluene diisocyanate (TDI) having 80 wt % of the 2,4 isomer and 20 wt % of the 2,6 isomer (available from The Dow Chemical Company).

Asphalt An asphalt composition numbered 90 (available from Royal Dutch Shell China).

Formation of CME Polyol

A CME Polyol 1 is prepared by mixing D.E.R.™ 383 and CNSL A. In particular, approximately 182 grams of D.E.R.™ 383 and approximately 330 grams of CNSL A are added to a 4-necked round bottom flask (equipped with a thermometer, a mechanical stirrer, and a nitrogen connection) to form a reaction mixture for forming the CME Polyol 1. In the reaction mixture, a ratio of epoxy groups in the D.E.R™ 383 to epoxy reactive hydroxyl groups in the CNSL A is approximately 1:1.05. Then, the flask is thoroughly purged and protected with nitrogen for 10 minutes. Next, agitation of the reaction mixture within the flask is started at room temperature (i.e., within the approximately range of 20° C. to 23.5° C.) and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture for forming the CME Polyol 1 has cooled to 40° C. The resultant CME Polyol 1 includes a component having the following Molecular Structure 1:

A CME Polyol 3 is prepared by mixing XY694 and CNSL A. In particular, approximately 125 grams of XY694 and approximately 330 grams of CNSL A are added to a 4-necked round bottom flask (equipped with a thermometer, a mechanical stirrer, and a nitrogen connection) to form a reaction mixture for forming the CME Polyol 3. In the reaction mixture, a ratio of epoxy groups to epoxy reactive hydroxyl groups is approximately 1:2.2. Then, the flask is thoroughly purged and protected with nitrogen for 10 minutes. Next, agitation of the reaction mixture within the flask is started at room temperature and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture for forming the CME Polyol 3 has cooled to 40° C. The resultant CME Polyol 3 includes a component having the following Molecular Structure 3:

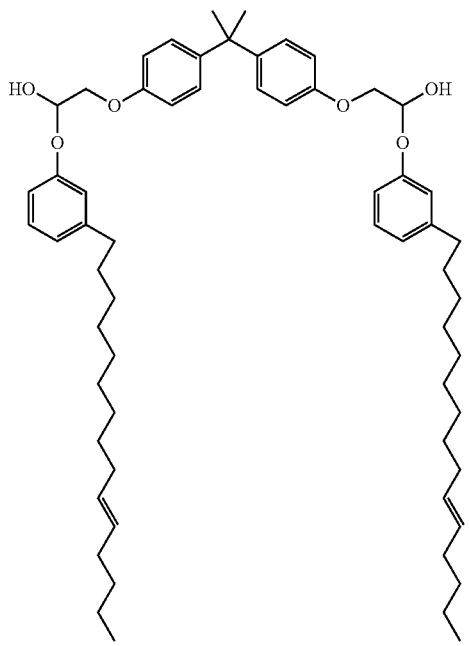

Molecular Structure 1

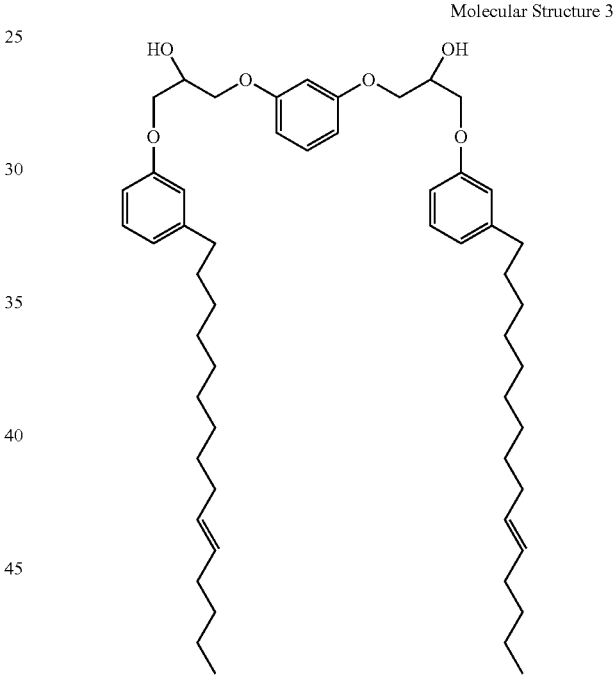

Molecular Structure 3

A CME Polyol 2 is prepared by mixing D.E.R.™ 736 epoxy resin and CNSL A. In particular, approximately 185 grams of D.E.R.™ 736 epoxy resin and approximately 330 grams of CNSL A are added to a 4-necked round bottom flask (equipped with a thermometer, a mechanical stirrer, and a nitrogen connection) to form a reaction mixture for forming the CME Polyol 2. In the reaction mixture, a ratio of epoxy groups to epoxy reactive hydroxyl groups is approximately 1:1.05. Then, the flask is thoroughly purged and protected with nitrogen for 10 minutes. Next, agitation of the reaction mixture within the flask is started at room temperature and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture for forming the CME Polyol 2 has cooled to 40° C.

A CME Polyol 4 is prepared by mixing XY636 and CNSL A. In particular, approximately 142 grams of XY636 and approximately 330 grams of CNSL A are added to a 4-necked round bottom flask (equipped with a thermometer, a mechanical stirrer, and a nitrogen connection) to form a reaction mixture for forming the CME Polyol 4. In the reaction mixture, a ratio of epoxy groups to epoxy reactive hydroxyl groups is approximately 1:2.2. Then, the flask is thoroughly purged and protected with nitrogen for 10 minutes. Next, agitation of the reaction mixture within the flask is started at room temperature and approximately 0.26 grams of Catalyst A is added into the reaction mixture, during which time period agitation is continued and heat is applied to the reaction mixture. Once a temperature of 160° C. is reached, that temperature is maintained for four hours.

Thereafter, nitrogen protection is continued until the reaction mixture for forming the CME Polyol 2 has cooled to 40° C.

Formation of Prepolymer

Next, Prepolymers 1-5 are prepared using CME Polyol 1 and CME Polyol 2, according to the formulations in Table 1, below. To form the Prepolymers 1-5, at least one polyol (i.e., CME Polyol 1, CME Polyol 2, and/or VORANOL™ 2110-TB) are reacted with the isocyanate (i.e., VORANATE™ T 80) to synthesize polyurethane based prepolymers having an NCO content from 4.5% to 6% NCO content (i.e., isocyanate group content based on the total weight of the prepolymer component).

TABLE 1

|  | Prepolymer No. 1 | Prepolymer No. 2 | Prepolymer No. 3 | Prepolymer No. 4 | Prepolymer No. 5 |
| --- | --- | --- | --- | --- | --- |
| CME Polyol 1 (wt %) | — | — | — | — | 3.7 |
| CME Polyol 2 (wt %) | — | — | 7.7 | 7.4 | 3.7 |
| VORANOL™ 2110-TB (wt %) | 77.2 | 74.6 | 69.3 | 67.0 | 67.0 |

TABLE 1-continued

|  | Prepolymer No. 1 | Prepolymer No. 2 | Prepolymer No. 3 | Prepolymer No. 4 | Prepolymer No. 5 |
| --- | --- | --- | --- | --- | --- |
| VORANATE™ T 80 (wt %) | 22.8 | 25.4 | 23.0 | 25.6 | 25.6 |
| NCO Content (wt %) | 4.9 | 6.1 | 4.8 | 6.2 | 5.9 |

In particular, the Prepolymers 1-5 are prepared by adding the appropriate amount of the isocyanate VORANATE™ T 80 into a 1000 mL four-necked flask equipped with condenser, thermometer, mechanical stirrer, and dropping funnel. The flask is thoroughly purged and protected with nitrogen. Agitation is started at room temperature (approximately 25° C.). If more than two polyols are used, the polyols are mixed prior to mixing with the isocyanate (the polyol mixture is dried with toluene reflux under DEAN STARK equipment before use). Then polyol mixture is then added dropwise into the isocyanate, together with the temperature slowly increasing toward 60° C. After the total system temperature is stable, the temperature is raised to 70° C. for 2 hours. Thereafter, 2 drops of benzoyl chloride (as a neutralizing agent) is added into the reaction product. The resultant prepolymer is then titrated to check the NCO content.

Prepolymer 1 and 2 are synthesized with VORANATE™ T 80 isocyanate and VORANOL™ 2110-TB polyol with designed NCO content of 4.5% and 6%, respectively. Prepolymer 3 and 4 are synthesized by replacing 10% weight percentage of VORANOL™ 2110-TB with CME polyol 2 (C736), with different designed NCO content of 4.5% and 6%, respectively. Prepolymer 5 is synthesized by replacing 5% weight percentage of VORANOL™ 2110-TB with CME polyol 2 (C736) and replacing another 5% weight percentage of VORANOL™ 2110-TB with CME Polyol 1 (C383). The designed NCO content for Prepolymer 5 is 6%.

Formation of Asphalt Composition Using Prepolymers

The asphalt based compositions of Working Examples 1-6 and Comparative Examples A and B are prepared according to the formulations in Table 2, below.

TABLE 2

|  | Ex. 1 | Ex. 2 | Ex. 3 | Ex. 4 | Ex. 5 | Ex. 6 | Comp. Ex. A | Comp. Ex. B |
| --- | --- | --- | --- | --- | --- | --- | --- | --- |
| Prepolymer (from Table 1) | 3 | 4 | 4 | 4 | 4 | 5 | 1 | 2 |
| Formulation (wt. %) | | | | | | | | |
| Prepolymer | 49 | 42 | 39 | 34 | 30 | 44 | 48 | 43 |
| MOCA | 5 | 6 | 5 | 4 | 4 | 5 | 5 | 5 |
| Asphalt | 38 | 43 | 46 | 51 | 54 | 42 | 39 | 43 |
| Solvent | 8 | 9 | 10 | 11 | 12 | 9 | 8 | 9 |
| Asphalt Composition Properties | | | | | | | | |
| Resin Index | 1.5 | 1.5 | 1.5 | 1.5 | 1.5 | 1.5 | 1.5 | 1.5 |
| Resultant Product Properties | | | | | | | | |
| Tensile Strength (MPa) | 2.73 | 2.70 | 2.53 | 2.45 | 1.55 | 2.23 | 2.04 | 1.72 |
| Elongation (%) | 849 | 570 | 614 | 656 | 392 | 455 | 534 | 353 |
| Compatibility | + | + | + | + | + | + | − | − |

The prepolymer is referred to as part A of the asphalt composition. The remainder is referred to as part B of the asphalt composition. Prior to forming part B, the asphalt is heated at 110° C. for 2 hours to get softened. Then, toluene is added to the softened asphalt to lower viscosity. The resultant mixture is stirred by mechanical stirrer at 5000 rpm to obtain a more homogenous dispersion. MOCA was firstly heated to 120° C. to melt. MOCA is then added into the mixture and immediately blended using a speed mixer at 3000 rpm for 3 min at room temperature. Then, parts A and B are mixed together with a calculated amount based on an index of 1.5 and blended using speed mixer at 3000 rpm for 2 minutes at room temperature. The resultant compositions are then poured into room temperature molds, respectively, for curing at room temperature and 50±5% relative humidity for 2 days and followed by 2 hours of heating at 80° C. before measuring properties such mechanical properties test are performed on the cured samples.

Figure 1B:
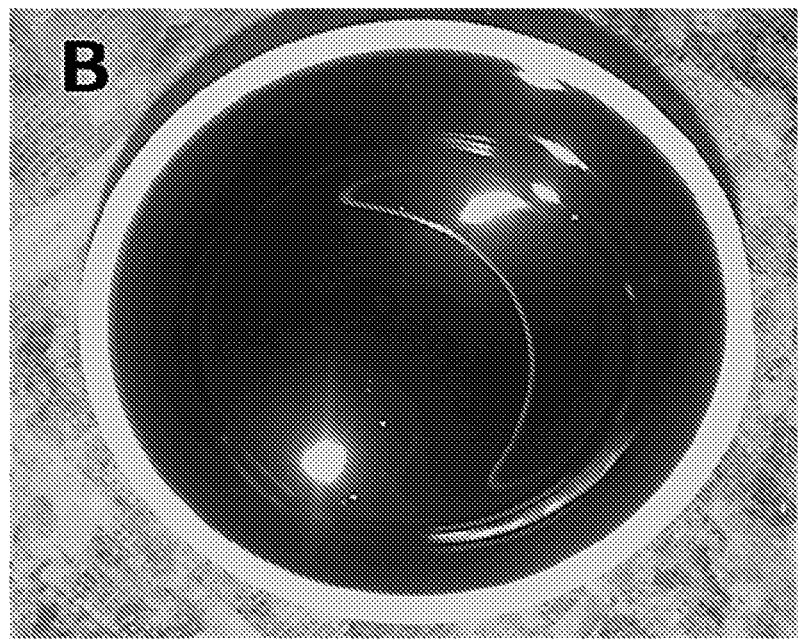

Tensile strength and elongation are measured according to the ISO 527 standard. The compatibility test is performed with samples of formulations being blended using a speed mixer ay 3000 revolutions per minute (rpm) for 2 minutes (min) at room temperature. The formulations are casted on steel panels with a 400 microns drawdown applicator and the resultant coated panels were conditioned at a temperature of 23° C. and relative humidity of 50% for 7 days. The compatibility test is based on naked eye observation of the mixture surfaces when coated on a test surface. In particular, the samples are added into a vessel to visibly inspect toe the mixture surface. Signal "+" means the resultant surface is observed to be uniform. Signal "−" means that small domains, phase separations, and/or cracks are observed on the resultant surface. Referring to FIG. 1A (compatibility test results of Comparative Example B where phase separation is observed) and FIG. 1B (compatibility test results of Working Example 2 where phase separation is not observed), the images on which the naked eye observation test is based show a clear difference between Comparative Example B and Working Example 2.

Formation of Asphalt Composition Using Separate Polyol and Isocyanate

The asphalt based compositions of Working Examples 7-10 and Comparative Examples C and D are prepared according to the formulations in Table 3, below.

TABLE 3

|  | Ex. 7 | Ex. 8 | Ex. 9 | Ex. 10 | Comp. Ex. C | Comp. Ex. D |
|---|---|---|---|---|---|---|
| Formulation (wt. %) | | | | | | |
| PAPI ™ 27 | 9 | 10 | 9 | 11 | 10 | 4 |
| CME Polyol 1 | 26 | — | — | — | — | — |
| CME Polyol 2 | — | 30 | — | — | — | — |
| CME Polyol 3 | — | — | 28 | — | — | — |
| CME Polyol 4 | — | — | — | 27 | — | — |
| VORANOL ™ 2110-TB | — | — | — | — | 30 | — |
| PolyBd | — | — | — | — | — | 27 |
| Asphalt | 52 | 60 | 56 | 55 | 60 | 55 |
| Catalyst B | <0.1 | <0.1 | <0.1 | <0.1 | <0.1 | <0.1 |
| Solvent | 13 | 0 | 7 | 7 | 0 | 14 |
| Asphalt Composition Properties | | | | | | |
| Resin Index | 1.2 | 1.2 | 1.2 | 1.2 | 1.2 | 1.2 |
| Resultant Product Properties | | | | | | |
| Maximum Force (N) | 784 | 1583 | 1386 | 1412 | 451 | 885 |
| Shearing Strength (MPa) | 1.51 | 3.04 | 2.66 | 2.72 | 0.87 | 1.7 |

In these examples, PAPI™ 27 is applied directly as an isocyanate component with a resin index of 1.2 for the polyurethane composition. The polyol component is varied is each of the example, as shown in Table 3. The applied asphalt content is approximately two times the polyol component weight. DMDEE is used as the catalyst to increase the curing time with a loading content of approximately 0.1 percentage of the polyol weight. Based on the viscosity of the polyol component, toluene is added as solvent. The low boiling point solvent will be evaporated in the curing process and should not influence the mechanical properties of the final cured composition. For example, for the relatively lower viscosity VORANOL™ 2110-TB and CME Polyol 2, no solvent is added into the composition. For the medium viscosity CME Polyol 3 and CME Polyol 4 the amount of solvent added is approximately 25 wt % of the polyol weight. For higher viscosity PolyBd and CME Polyol 1 the amount of solvent added is approximately 50-52 wt % of the polyol weight is added.

The maximum force is measured directly on an INSTRON® force measure instrument. In particular, the two wood stripes (each with 8 cm in length, 2.9 cm in width, and 1.5 mm in thickness) are arranged overlapping the test sample. In particular, the composition is pasted on the frontier 1.8 cm length of the wood stripes. Then, two stripes are overlapped together with the composition pasted area facing each other. The stripes are fixed with clamps and cured for 2 days at room temperature with 50±5% relative humidity and followed by 4 hours heating at 80° C. before measuring. The INSTRON® drags the test sample until the two stripes are separated, which required force is recorded by the INSTRON® as the maximum force. Maximum force could be read out during test and shearing strength was calculated by the maximum force divided with contacting area of the two fixed wood stripes. The shearing strength is related to the maximum force and it is acquired from the value of the maximum force divided by the contacting area of the wood stripe.

Comparative Example C shows that VORANOL™ 2110-TB does not offer enough compatibility with asphalt, and the shearing strength is the lowest of all the examples in Table 3. Replacing VORANOL™ 2110-TB with PolyBd doubles the shearing strength, as shown in Comparative Example D (it is believed the low polarity of poly butadiene polyol that does not have any ether bonds on the polyol backbone may have an effect). The working examples show good shearing strength compared to the comparative examples. It is believed that the improved mechanical property is related to the good compatibility of CME polyols with asphalt.

Other Examples

In another example, a glycidyl ether of CNSL (CNSLGE) may be formed to be added to the polyurethane based asphalt composition. In particular, the glycidyl ether of CNSL is prepared by epoxidation reaction. A 5 L, 4-neck, glass, round bottom reactor is charged with distilled cashew nut-shell liquid (750.0 g, 3.7 hydroxyl equivalent [eq.]), epichlorohydrin (1710.60 g, 18.48 moles, 5:1 epichlorohydrin: hydroxyl eq.), isopropanol (921.1 g, 35 wt % of epichlorohydrin used), and deionized (DI) water (148.8 g, 6 wt % of epichlorohydrin used) in the indicated order. The reactor is additionally equipped with a condenser (maintained at 0° C.), a thermometer, a Claisen adaptor, an overhead nitrogen inlet (1 LPM $N_2$ used), and a stirrer assembly (Teflon™ paddle, glass shaft, and variable speed motor). (Teflon fluorocarbon resin is a trademark of E.I. DuPont de Nemours.)

A controller monitors the temperature registered on the thermometer in the reactor and provided heating via the heating mantle placed under the reactor as well as cooling delivered by a pair of fans positioned on the reactor exterior. Sodium hydroxide (133.05 g, 3.33 moles) dissolved in DI water (532.2 g) for the initial addition is added to a side arm vented addition funnel, sealed with a ground glass stopper, and attached to the reactor. Stirring and heating commences to give a 52° C. solution followed by commencement of dropwise addition of the aqueous sodium hydroxide solution. The reaction temperature is maintained at 52° C. during the 2.25 hr aqueous sodium hydroxide addition time via cooling of the reactor exterior from the fans as needed. After 20 min of post-reaction at 52° C., stirring and heating ceased, and the reactor contents are added to a pair of 2 L separatory funnels. The aqueous phase and a minor amount of dark colored insoluble material are drained off and discarded as waste and the remaining organic layer added back into the reactor.

Then, stirring and heating of the 44° C. solution is resumed. Sodium hydroxide (59.13 g, 1.478 moles) dissolved in DI water (236.5 g) is added to a side arm vented addition funnel, sealed with a ground glass stopper, and then attached to the reactor. Stirring and heating is commenced to reestablish a 52° C. solution followed by commencement of dropwise addition of the aqueous sodium hydroxide solution. The reaction temperature is maintained at 52° C. during the 1 hr aqueous sodium hydroxide addition time via cooling of the reactor exterior from the fans as needed. After 20 min of post-reaction at 52° C., stirring and heating ceased, and the reactor contents are added to a pair of 2 L separatory funnels. The aqueous phase and a minor amount of dark colored insoluble material are drained off and discarded as waste and the remaining organic layer added back into the reactor.

Stirring and heating of the 40° C. solution resumed. Sodium hydroxide (14.78 g, 0.37 moles) dissolved in DI water (59.1 g) is added to a side arm vented addition funnel, sealed with a ground glass stopper, then attached to the reactor. Stirring and heating commenced to reestablish a 52° C. solution followed by commencement of dropwise addition of the aqueous sodium hydroxide solution. The reaction temperature is maintained at 52° C. during the 15 min aqueous sodium hydroxide addition time via cooling of the reactor exterior from the fans as needed. After 20 min of post-reaction at 52° C., stirring and heating ceased, and the reactor contents were equally split into a pair of 2 L separatory funnels. The aqueous phase is drained off and discarded as waste.

To the contents of each separatory funnel is added 400 mL of DI water and the contents are washed with the DI water by vigorously shaking the funnels. The washed product in each of the funnels is allowed to settle for <30 min to resolve, allowing the aqueous and organic phases to re-form in the funnels; and then the aqueous phase was removed from each of the funnels and discarded as waste. Second and third washes were carried out using the aforementioned method.

Rotary evaporation of the organic phase using a maximum oil bath temperature of 110° C. to a final vacuum of 4.7 mm of Hg removed the bulk of volatiles present in the organic phase. A total of 911.52 g of amber colored, slightly hazy liquid is recovered after completion of the rotary evaporation. Epoxide titration indicated that the resultant liquid had an EEW of 387. A standard titration method is used to determine percent epoxide in the various epoxy resins. A sample is weighed (ranging from about 0.1 g to about 0.2 g) and dissolved in dichloromethane (10 mL). Tetraethylammonium bromide solution in acetic acid (30 mL) is added to the sample. The resultant solution is treated with 3 drops of crystal violet solution (0.1% w/v in acetic acid) and titrated with 0.1N perchloric acid in acetic acid on a Metrohm 665 Dosimat titrator (Brinkmann) Titration of a blank sample comprising dichloromethane (10 mL) and tetraethylammonium bromide solution in acetic acid (30 mL) provided correction for solvent background.

In yet another example, A CNSL modified epoxy (CME) is prepared by the following general procedure: 85 parts by weight D.E.R.™ 331, 12.8 parts by weight cardanol and 2.2 parts by weight cardol are mixed under a nitrogen atmosphere. After the mixture reaches a temperature of approximately 90° C., 300 ppm of ethyl triphenyl phosphonium acetate (70 wt % methanol solution) is added as catalyst. The resultant mixture is heated to 170° C. and kept at this temperature for 3 hr. A CNSL modified epoxy is then obtained. Epoxide titration indicated that the CNSL modified epoxy had an EEW of 250. In this case, a sufficient amount of CNSL for forming a polyol may not be added, this is based on the EEW that may be higher than what is desired to form a polyurethane based asphalt composition.

The invention claimed is:

1. A polyurethane based asphalt composition, comprising:
   an asphalt component; and
   a polyurethane resin system that is the reaction product of an isocyanate component that includes at least one polyisocyanate and an isocyanate-reactive component that includes a cardanol-modified epoxy polyol, the cardanol-modified epoxy polyol being a reaction product of an epoxy component and an epoxy-reactive component at a ratio of epoxy groups to epoxy reactive groups from 1:0.95 to 1:5, the epoxy-reactive component including a cardanol component.

2. The polyurethane based asphalt composition as claimed in claim 1, wherein the cardanol component has a cardanol content of at least 50 wt %, based on a total weight of the cardanol component.

3. The polyurethane based asphalt composition as claimed in claim 2, wherein the cardanol component is cashew nutshell liquid.

4. The polyurethane based asphalt composition as claimed in claim 1, wherein the asphalt component accounts for 35 wt % to 60 wt % and the polyurethane resin system accounts for 35 wt % to 65 wt %, based on the total weight of the polyurethane based asphalt composition.

5. The polyurethane based asphalt composition as claimed in claim 1, wherein the polyurethane resin system includes an isocyanate-terminated prepolymer having an isocyanate moiety content from 2 wt % to 15 wt %, which isocyanate-terminated prepolymer is the reaction product of the at least one polyisocyanate and the cardanol component.

6. The polyurethane based asphalt composition as claimed in claim 1, wherein the polyurethane resin system has an isocyanate index from 60 to 300.

7. A composite material comprising the polyurethane based asphalt composition as claimed in claim 1.

8. A process for preparing a polyurethane based asphalt composition, comprising:
   providing a cardanol-modified epoxy polyol that is a reaction product of an epoxy component and an epoxy-reactive component at a ratio of epoxy groups to epoxy reactive groups from 1:0.95 to 1:5, the epoxy-reactive component including a cardanol component,
   preparing a polyurethane resin system by mixing an isocyanate component that includes at least one polyisocyanate and an isocyanate-reactive component that includes the cardanol-modified epoxy polyol, and
   mixing the polyurethane resin system and an asphalt component.

9. A process for preparing a polyurethane based coating, comprising:
   (A) preparing a polyurethane based asphalt composition, by
   providing a cardanol-modified epoxy polyol that is a reaction product of an epoxy component and an epoxy-reactive component at a ratio of epoxy groups to epoxy reactive groups from 1:0.95 to 1:5, the epoxy-reactive component including a cardanol component,
   preparing a polyurethane resin system by mixing an isocyanate component that includes at least one polyisocyanate and an isocyanate-reactive component that includes the cardanol-modified epoxy polyol, and mixing the polyurethane resin system and an asphalt component; and (B) curing the polyurethane based asphalt composition.

* * * * *